US007139678B2

(12) United States Patent
Kobayashi et al.

(10) Patent No.: US 7,139,678 B2
(45) Date of Patent: Nov. 21, 2006

(54) METHOD AND APPARATUS FOR PREDICTING BOARD DEFORMATION, AND COMPUTER PRODUCT

(75) Inventors: Yoko Kobayashi, Kawasaki (JP); Hidehisa Sakai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 15 days.

(21) Appl. No.: 11/023,689

(22) Filed: Dec. 29, 2004

(65) Prior Publication Data
US 2006/0036401 A1 Feb. 16, 2006

(30) Foreign Application Priority Data
Aug. 11, 2004 (JP) ............................. 2004-234717

(51) Int. Cl.
*G06F 17/00* (2006.01)
(52) U.S. Cl. .................. 702/183; 702/136; 702/35; 716/15
(58) Field of Classification Search ................ 702/183, 702/33, 34–36, 42, 43, 81–84, 132, 136, 702/179, 181, 185; 716/15, 4
See application file for complete search history.

(56) References Cited
U.S. PATENT DOCUMENTS

| 5,657,242 A | 8/1997 | Sekiyama et al. ............ 716/15 |
| 6,275,750 B1 | 8/2001 | Uchida et al. ............... 700/300 |
| 6,584,608 B1* | 6/2003 | Kumada et al. .............. 716/15 |
| 2004/0073397 A1 | 4/2004 | Matsuyama et al. ........ 702/136 |

FOREIGN PATENT DOCUMENTS

| EP | 0 552 935 A2 | 1/1993 |
| EP | 1 359 521 A1 | 11/2003 |
| JP | 05-205011 | 8/1993 |
| JP | 10-093206 | 4/1998 |
| JP | 11-201647 | 7/1999 |
| JP | 2002-230047 | 8/2002 |
| JP | WO 02/063506 A1 | 8/2002 |

OTHER PUBLICATIONS

Chao-Pin Yeh et al., "Correlation of analytical and experimental to determine thermally induced PWB warpage", Dec. 1993, IEEE, IEEE Transactions on Components, Hybrids, and Manufacturing Technology, vol. 16, issue 8, pp. 986-995.*
Djurovic et al., "Analysis of thermal warpage in a PCB with an array of PTH connectors", Sep. 1999, IEEE, IEEE Transactions on Components and Packaging Technologies, vol. 22, issue 3, pp. 414-420.*

* cited by examiner

*Primary Examiner*—Hal Wachsman
(74) *Attorney, Agent, or Firm*—Arent Fox PLLC (57) ABSTRACT

An apparatus for predicting a deformation of a board includes a board dividing unit that divides the board into a plurality of areas based on wiring information on the board; and a deformation predicting unit that grasps a wiring pattern of an area macroscopically, calculates an equivalent physical property value equivalent to a modulus of longitudinal elasticity and a coefficient of thermal expansion by a finite element method, and predicts the deformation of the board based on the equivalent physical property value calculated for each of the areas divided by the board dividing unit.

11 Claims, 9 Drawing Sheets

```
 【STRUCTURE DATA】 NODE NUMBER
*NODE
       37,    156.4,   12.587,       1.52737E   - 7
**     38,    156.4,   12.46,        1.51806E   - 7
**
【STRUCTURE DATA】ELEMENT NUMBER
*ELEMENT, TYPE=CPE3, ELSET=zairyou1
       499,   834,    384,    863
**     506,   861,    882,    2432
**
【MATERIAL DATA】MATERIAL CONSTANT
*****************************************
*ELASTIC, TYPE=ISO
       1000,           0.3
*EXPANSION
 26.0E-6
**
*****************************************
*STEP
【LOAD DATA 1】 INITIAL TEMPERATURE CONDITION
*INITIAL CONDITIONS,TYPE=TEMPERATURE
 ALL,25
**
*****************************************
 CONSTRAINT DATA
** x-fix
**
*BOUNDARY, OP=NEW
    76915, 1,,         0.
    76916, 1,,         0.
**
** y-fix
**
*BOUNDARY, OP=NEW
      76923, 2,,    0.
**
**
 【LOAD DATA 2】 TEMPERATURE CONDITION
*TEMPERATURE
 ALL,95
**
**
*****************************************
 【OUTPUT DATA】 NECESSARY RESULT
*NODE PRINT, FREQ=99999
 U,
*NODE FILE, FREQ=99999
 U,
**
*EL PRINT,POS=CENTROIDAL,FREQ=99999
 S,
 E,
**
*EL FILE, POS=CENTROIDAL, FREQ=99999
 S,
 E,
**
*END STEP
```

METHOD AND APPARATUS FOR PREDICTING BOARD DEFORMATION, AND COMPUTER PRODUCT

BACKGROUND OF THE INVENTION

1) Field of the Invention

The present invention relates to a technology for predicting a warp of a printed-wiring-board efficiently.

2) Description of the Related Art

In recent years, in accordance with a reduction in thickness of a printed-wiring-board used in electronic apparatuses such as a personal computer and a cellular phone and an increase in a density of a wiring pattern, a problem due to warp of a printed-wiring-board occurs. Therefore, it is necessary to predict warp that occurs in a printed-wiring-board and, when occurrence of warp to be a problem is predicted, take measures like examination of a reinforcement structure for the printed-wiring-board and change of a layout of components in advance.

As a method of predicting warp that occurs in a printed-wiring-board, there are a method of producing a printed-wiring-board in advance, applying a test to the produced printed-wiring-board, and verifying a problem related to warp of the board (prototype evaluation) and a method of modeling wiring patterns of a printed-wiring-board and predicting warp of the board using a simulation technique like a finite element method. Note that, in Japanese Patent Application Laid-Open No. 2002-230047, an algorithm like a quadtree area division is implemented for wiring patterns to make it possible to perform a thermal analysis calculation related to the printed-wiring-board.

However, in the conventional technology, there is a problem in that it is impossible to predict warp of a printed-wiring-board efficiently.

For example, prediction of warp of a printed-wiring-board by the prototype evaluation can carry out verification concerning warp only after all steps from designing to manufacturing of the printed-wiring-board are completed. Therefore, time and cost for the verification are enormous.

In addition, when verification of warp is carried out using a simulation such as the finite element method, modeling of a printed-wiring-board is required. With a wiring density being increased, since a wiring part affects warp significantly, it is necessary to model wiring patterns accurately.

However, since a wiring pitch is made finer, in order to model all wiring patterns in detail, it is necessary to carry out finite element division innumerable times. Thus, it is difficult to model all wiring parts in detail even with the present computer performance.

SUMMARY OF THE INVENTION

It is an object of the present invention to solve at least the above problems in the conventional technology.

An apparatus for predicting a deformation of a board according to one aspect of the present invention includes a board dividing unit that divides the board into a plurality of areas based on wiring information on the board; and a deformation predicting unit that grasps a wiring pattern of an area macroscopically, calculates an equivalent physical property value equivalent to a modulus of longitudinal elasticity and a coefficient of thermal expansion by a finite element method, and predicts the deformation of the board based on the equivalent physical property value calculated for each of the areas divided by the board dividing unit.

A method of predicting a deformation of a board according to another aspect of the present invention includes dividing the board into a plurality of areas based on wiring information on the board; and predicting the deformation of the board based on an equivalent physical property value obtained by grasping a wiring pattern of an area macroscopically and calculating the equivalent physical property value equivalent to a modulus of longitudinal elasticity and a coefficient of thermal expansion based on a finite element method for each of the areas divided.

A computer-readable recording medium according to still another aspect of the present invention stores a computer program that causes a computer to execute the above method according to the present invention.

The other objects, features, and advantages of the present invention are specifically set forth in or will become apparent from the following detailed description of the invention when read in conjunction with the accompanying drawings.

DETAILED DESCRIPTION

Exemplary embodiments of a method and an apparatus for predicting a board deformation, and a computer product according to the present invention will be explained in detail with reference to the accompanying drawings.

Figure 1A:
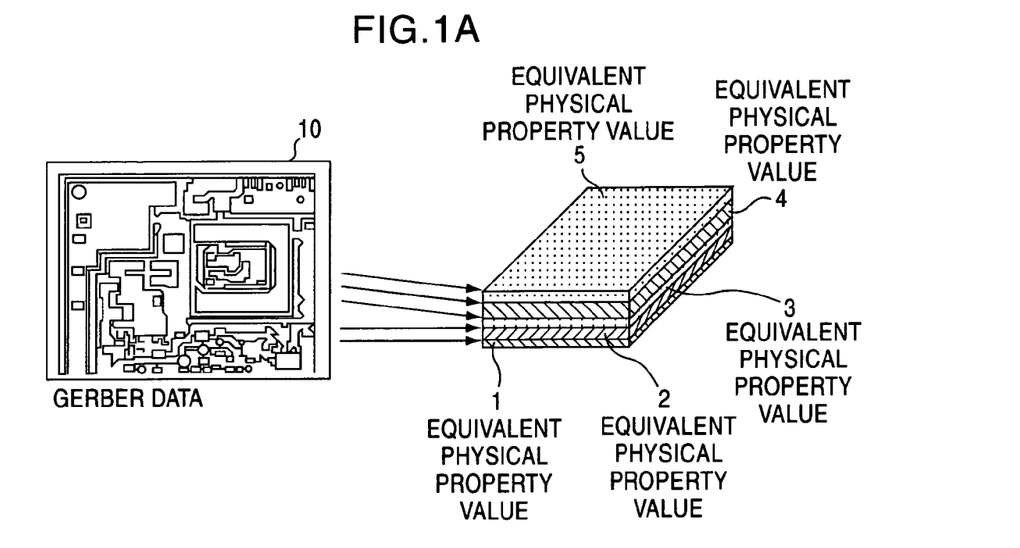
FIG. 1A is an explanatory diagram for explaining a concept of board deformation prediction according to an embodiment of the present invention.
Figure 1B:
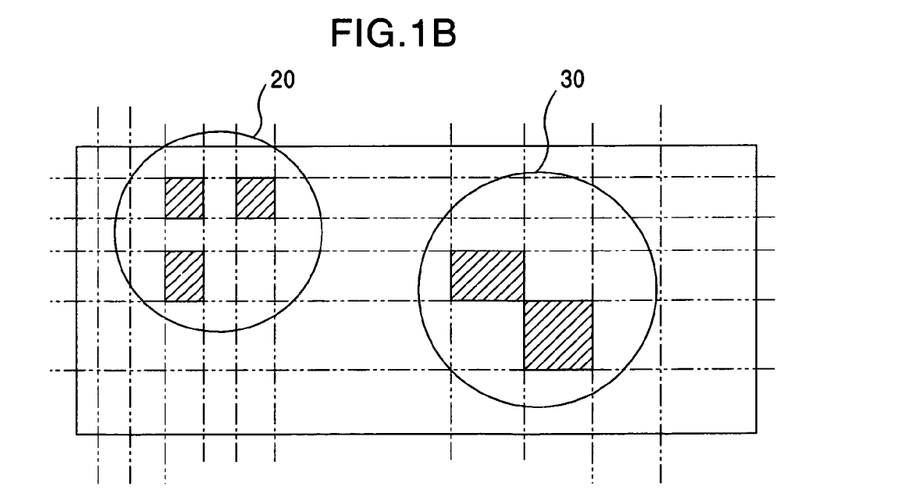
FIG. 1B is an explanatory diagram for explaining the concept of the board deformation prediction according to the embodiment in FIG. 1A.

FIGS. 1A and 1B are explanatory diagrams for explaining the concept of the board deformation prediction according to an embodiment of the present invention. As shown in FIG. 1A, the present invention grasps wiring patterns included in a board macroscopically based on computer aided design (CAD) data (hereinafter, "Gerber data") 10 and calculates equivalent physical property values equivalent to a modulus of longitudinal elasticity and a coefficient of thermal expansion that are calculated by a finite element method or the like.

According to the present embodiment, as shown in FIG. 1B, a board is divided with roughness corresponding to densities of wiring patterns, and equivalent physical property values are calculated for each of the divided areas. According to the present embodiment, the board is divided finely for an area 20 with a high density of wiring patterns is divided roughly for an area 30 with a low density of wiring patterns.

Then, equivalent physical property values for each of the areas in respective layers are calculated, and simulation is executed based on the calculated equivalent physical property values to predict warp of the board. In the case of FIG. 1A, equivalent physical property values 1 to 5 (the equivalent physical property values 1 to 5 are values including the equivalent physical property values for each of the areas in respective layers) are calculated based on Gerber data, and simulation is executed based on the calculated equivalent physical property values 1 to 5 to predict warp of a printed-wiring-board.

Figure 2:
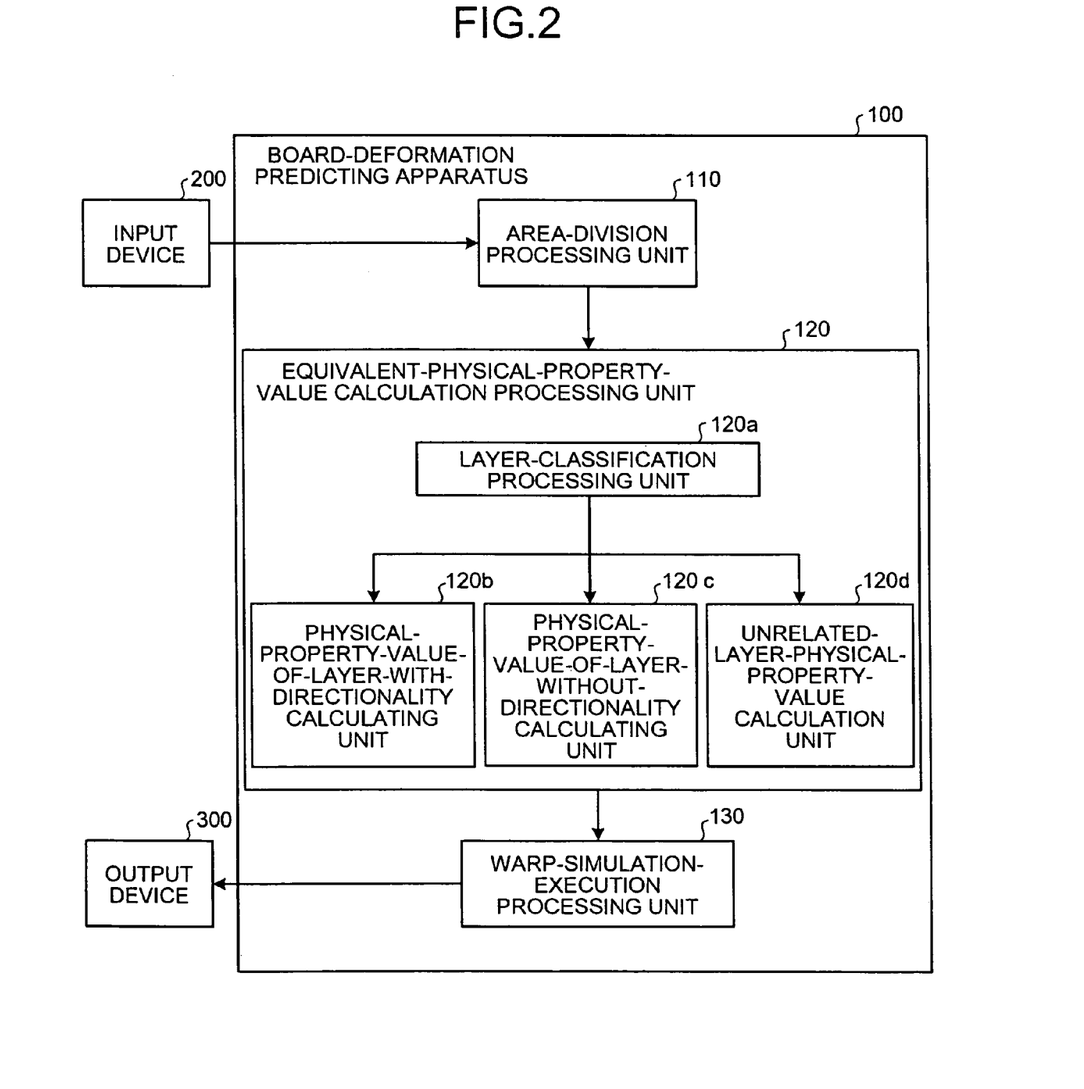
FIG. 2 is a functional block diagram of a structure of a board deformation predicting apparatus according to the embodiment in FIG. 1A.

FIG. 2 is a block diagram of the structure of the board deformation predicting apparatus according to the present embodiment. As shown in the figure, this board-deformation predicting apparatus 100 is connected to an input device 200 like a keyboard or a mouse and an output device 300 like a display.

Figure 3:
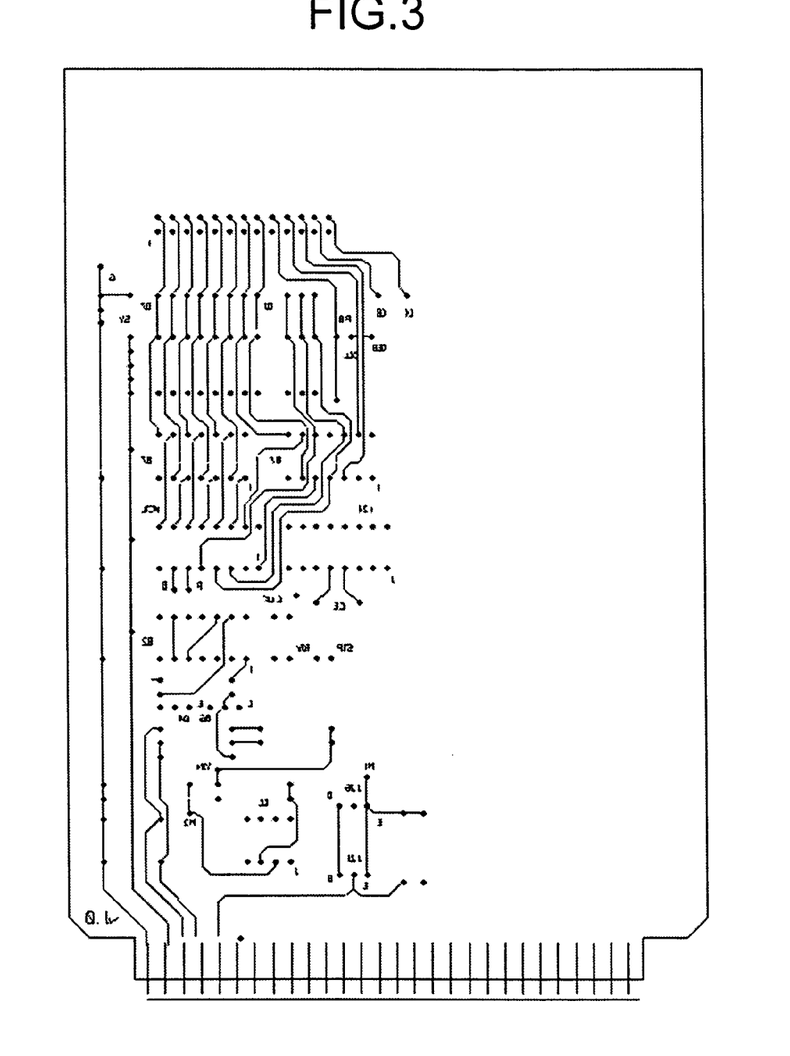
FIG. 3 is a diagram of an example of Gerber data.

The input device 200 is a device that inputs Gerber data, matrix physical property values (including a modulus of longitudinal elasticity of a board matrix and a coefficient of thermal expansion of the board matrix), and the like to the board deformation predicting apparatus 100. FIG. 3 shows an example of the Gerber data. As shown in the figure, the Gerber data includes information like wiring densities of a board. In addition, the output device 300 is a device that displays a simulation result concerning warp of the board outputted from the board deformation predicting apparatus 100.

The board deformation predicting apparatus 100 is an apparatus that predicts warp of a board based on Gerber data and the like inputted from the input device 200. The board deformation predicting apparatus 100 includes an area division processing unit 110, an equivalent-physical-property-value-calculation processing unit 120, and a warp-simulation-execution processing unit 130. The area division processing unit 110, the equivalent-physical-property-value-calculation processing unit 120, and the warp-simulation-execution processing unit 130 will be hereinafter explained in order.

The area division processing unit 110 is a processing unit that receives Gerber data from the input device 200 and divides a board into plural areas based on the received Gerber data. In addition, the area division processing unit 110 divides the board with roughness corresponding to wiring pattern densities rather than dividing the board uniformly. Here, a wiring pattern density is a value representing the number of wirings per a unit area.

Figure 4:
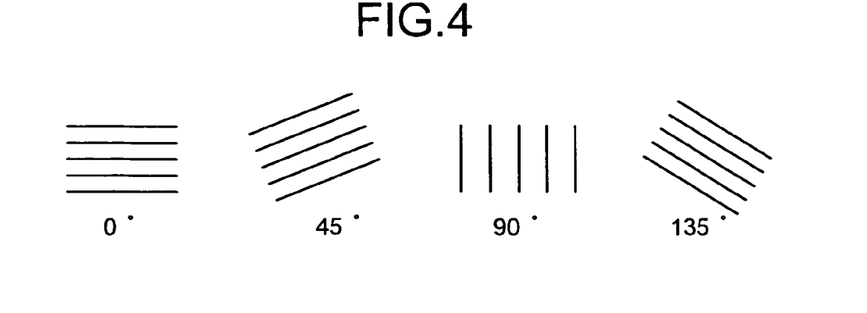
FIG. 4 is an explanatory diagram for explaining a wiring direction.

In addition, the area division processing unit 110 calculates a wiring pattern density in each wiring direction with respect to each of the divided areas in respective layers. FIG. 4 is an explanatory diagram for explaining a wiring direction. In the present embodiment, as shown in FIG. 4, assuming that there are four kinds of wiring directions, 0°, 45°, 90°, and 135°, a wiring pattern density is calculated for each of the angles.

Then, the area division processing unit 110 passes the Gerber data, information on the divided areas, the wiring pattern densities, the matrix physical property values, and the like to the equivalent-physical-property-value-calculation processing unit 120.

The equivalent-physical-property-value-calculation processing unit 120 is a processing unit that calculates an equivalent physical property value for each of the areas in respective layers. The equivalent-physical-property-value-calculation processing unit 120 includes a layer classification processing unit 120a, a physical property value of layer with directionality calculating unit 120b, a physical property value of layer without directionality calculating unit 120c, and an unrelated layer physical property calculating unit 120d.

The layer classification processing unit 120a is a processing unit that analyzes Gerber data and classifies layers into a layer having directionality of a wiring pattern (hereinafter, "a layer with directionality"), a layer not having directionality of a wiring pattern (hereinafter, "a layer without directionality") like a power supply layer and a ground layer, and a layer not directly contributing to warp of an entire board (hereinafter, "an unrelated layer").

Then, the layer classification processing unit 120a passes data of layers classified into the layer with directionality to the physical property value of layer with directionality calculating unit 120b, passes data of layers classified into the layer without directionality to the physical property value of layer without directionality calculating unit 120c, and passes data of layers classified into the unrelated layer to the unrelated layer calculating unit 120d.

The physical property value of layer with directionality calculating unit 120b is a processing unit that calculates equivalent physical values for a layer with directionality. This physical property value of layer with directionality calculating unit 120b calculates an equivalent physical property value in each wiring direction (hereinafter, "anisotropic physical property value") as a preparation for calculating the equivalent physical property values for the layer with directionality.

When an anisotropic physical property value is calculated, the physical property value of layer with directionality calculating unit 120b performs finite element analysis with wiring pattern densities and matrix physical property values as parameters in advance based on an experimental design method. The physical property value of layer with directionality calculating unit 120b establishes approximation equations for calculating an anisotropic physical property value at the time when wiring pattern densities, wiring directions, and matrix physical property values are designated arbitrarily according to a response surface methodology from a result of the calculation.

Equations for calculating an anisotropic physical property value are represented as $$Ex = a_0 + a_1 x_1 + a_2 x_1^2 + a_3 x_2 + a_4 x_2^2 + a_5 x_3 + a_6 x_3^2 \quad (1)$$

$$Ey = b_0 + b_1 x_1 + b_2 x_1^2 + b_3 x_2 + b_4 x_2^2 + b_5 x_3 + b_6 x_3^2 \quad (2)$$

$$\alpha x = c_0 + c_1 x_1 + c_2 x_1^2 + c_3 x_2 + c_4 x_2^2 + c_5 x_3 + c_6 x_3^2 \quad (3)$$

$$\alpha y = d_0 + d_1 x_1 + d_2 x_1^2 + d_3 x_2 + d_4 x_2^2 + d_5 x_3 + d_6 x_3^2 \quad (4)$$

As indicated in equations (1) to (4), an anisotropic physical property value in each wiring direction includes a modulus of longitudinal elasticity in an X direction Ex, a modulus of longitudinal elasticity in a Y direction Ey, a coefficient of thermal expansion in the X direction $\alpha x$, and a coefficient of thermal expansion in the Y direction $\alpha y$.

A wiring pattern density is substituted in $x_1$ included in equations (1) to (4), a matrix modulus of longitudinal elasticity is substituted in $x_2$, and a matrix coefficient of thermal expansion is substituted in $x_3$. In addition, $a_0$ to $a_6$, $b_0$ to $b_6$, $c_0$ to $c_6$, and $d_0$ to $d_6$ included in equations (1) to (4) are constants specified by the response surface methodology.

For example, when an anisotropic physical property value in a wiring direction 0° is calculated, it is necessary to execute simulations for all combinations (125 ways) of wiring pattern densities 0%, 20%, 40%, 60%, and 100%, moduli of longitudinal elasticity of a printed-wiring-board (hereinafter, "matrix moduli of longitudinal elasticity") 1000 MPa, 1500 MPa, 2000 MPa, and 2500 MPa, and coefficients of thermal expansion of the printed-wiring-board (hereinafter, "matrix coefficients of thermal expansion") 10 ppm, 12 ppm, 16 ppm, 18 ppm, and 20 ppm.

However, in the present embodiment, since the experimental design method is performed using an orthogonal table L25, it is possible to execute simulations of twenty-five ways, specify the constants $a_0$ to $a_6$, $b_0$ to $b_6$, $c_0$ to $c_6$, and $d_0$ to $d_6$ using a result of the executed calculation and the response surface methodology, and establish an approximation polynomial for calculating an anisotropic physical property value in each wiring direction. In addition, since a calculation method for anisotropic physical property values in the wiring directions 45°, 90°, and 135° is the same as the method of calculating an anisotropic physical property value in the wiring direction 0°, the calculation method will not be explained.

Then, after calculating anisotropic physical property values in the respective wiring directions, the physical property value of layer with directionality calculating unit 120b weighted-averages the anisotropic physical property values in the respective wiring directions based on a ratio of wiring pattern densities in the respective wiring directions included in the divided areas to calculate equivalent physical property values of the respective areas. Note that the equivalent physical property values of the respective areas calculated by the physical value of layer with directionality calculating unit 120b include a modulus of longitudinal elasticity for an equivalent physical property value in the X direction (hereinafter, "equivalent modulus of longitudinal elasticity"), an equivalent modulus of longitudinal elasticity in the Y direction, a coefficient of thermal expansion for an equivalent physical property value in the X direction (hereinafter, "equivalent coefficient of thermal expansion"), and an equivalent coefficient of thermal expansion in the Y direction.

For example, when a wiring pattern density with respect to the wiring direction 0° is 30%, a wiring pattern density with respect to the wiring direction 90° is 40%, and a wiring pattern density with respect to the wiring the other wiring direction is 30% in a certain divided area, an equivalent modulus of longitudinal elasticity Ex' in the X direction in the divided area is calculated from an equation $$Ex'=Ex0\times30\%+Ex90\times40\%+Exn\times30\%,$$

where Ex0 indicates a modulus of longitudinal elasticity in the X direction with respect to the wiring direction 0°, Ex90 indicates a modulus of longitudinal elasticity in the X direction with respect to the wiring direction 90°, and Exn indicates a modulus of longitudinal elasticity in the X direction with respect to the other wiring directions.

An equivalent modulus of longitudinal elasticity Ey' in the Y direction in the divided area is calculated from an equation $$Ey'=Ey0\times30\%+Ey90\times40\%+Eyn\times30\%,$$

where Ey0 indicates a modulus of longitudinal elasticity in the Y direction with respect to the wiring direction 0°, Ey90 indicates a modulus of longitudinal elasticity in the Y direction with respect to the wiring direction 90°, and Eyn indicates a modulus of longitudinal elasticity in the Y direction with respect to the other wiring directions.

An equivalent coefficient of thermal expansion αx' in the X direction in the divided area is calculated from an equation $$\alpha x'=\alpha x0\times30\%+\alpha x90\times40\%+\alpha xn\times30\%,$$

where αx0 indicates a coefficient of thermal expansion in the X direction with respect to the wiring direction 0°, αx90 indicates a coefficient of thermal expansion in the X direction with respect to the wiring direction 90°, and αxn indicates a coefficient of thermal expansion in the X direction with respect to the other wiring directions.

An equivalent coefficient of thermal expansion αy' in the Y direction in the divided area is calculated from an equation $$\alpha y'=\alpha y0\times30\%+\alpha y90\times40\%+\alpha yn\times30\%,$$

where αy0 indicates a coefficient of thermal expansion in the Y direction with respect to the wiring direction 0°, αy90 indicates a coefficient of thermal expansion in the Y direction with respect to the wiring direction 90°, and αyn indicates a coefficient of thermal expansion in the Y direction with respect to the other wiring directions.

The physical property value of layer with directionality calculating unit 120b passes the calculated equivalent modulus of longitudinal elasticity Ex' in the X direction, equivalent modulus of longitudinal elasticity Ey' in the Y direction, equivalent coefficient of thermal expansion αx' in the X direction, and equivalent coefficient of thermal expansion αy' in the Y direction for respective areas to the warp-simulation-execution processing unit 130 as equivalent physical property values.

The physical property value of layer without directionality calculating unit 120c is a processing unit that calculates an equivalent physical property value for a layer without directionality. This physical property value of layer without directionality calculating unit 120c is capable of calculating a modulus of longitudinal elasticity of a layer without directionality in the same manner as the physical property value of layer with directionality calculating unit 120b calculates a modulus of longitudinal elasticity of a layer with directionality. However, the physical property value of layer without directionality calculating unit 120c can calculate a modulus of longitudinal elasticity of a layer without directionality more easily based on an area ratio and a volume ratio.

In other words, in calculating a modulus of longitudinal elasticity with respect to an equivalent physical property value of a layer without directionality, the physical property value of layer without directionality calculating unit 120c calculates a modulus of longitudinal elasticity based on a volume ratio of a matrix for each divided area. Note that, since the physical property value of layer without directionality calculating unit 120c calculates a coefficient of thermal expansion for a layer without directionality using the same method as the calculation for a layer with directionality, the calculation of the coefficient of thermal expansion will not be explained.

A specific equation for calculating a modulus of longitudinal elasticity E for a layer without directionality is represented as $$E=E_1V_1/V+E_2V_2/V(V=V_1+V_1) \quad (5)$$

or $$1/E = (V_1/V) \times (1/E_1) + (V_2/V) \times (1/E_2) \quad (V = V_1 + V_2) \qquad (6)$$

$E_1$ included in equations (5) and (6) indicates a matrix modulus of longitudinal elasticity of a divided area, and $V_1$ indicates a volume of a matrix of the divided area. Here, the physical property value of layer without directionality calculating unit 120c calculates the matrix modulus of longitudinal elasticity of the divided area and the volume of the matrix in advance using Gerber data or the like.

$E_2$ included in equations (5) and (6) indicates a modulus of longitudinal elasticity of a wiring material of a divided area, and $V_2$ indicates a volume of the wiring material for the divided area. Here, the physical property value of layer without directionality calculating unit 120c calculates the modulus of longitudinal elasticity of the divided area and the volume of the wiring material in advance using Gerber data or the like.

Note that the physical property value of layer without directionality calculating unit 120c selects an equation most suitable for a divided area from equations (5) and (6) according to loading conditions and collation with experimental data in the past and calculates a modulus of longitudinal elasticity for each divided area using the selected equation.

Then, the physical property value of layer without directionality calculating unit 120c passes the calculated modulus of longitudinal elasticity and coefficient of thermal expansion for each divided area to the warp-simulation-execution processing unit 130 as equivalent physical property values.

The unrelated layer physical property value calculating unit 120d is a processing unit that calculates an equivalent physical property value for an unrelated layer. In calculating the equivalent physical property value for an unrelated layer, the unrelated layer physical property value calculating unit 120c can calculate the equivalent physical property value promptly by calculating a macro physical property value obtained by averaging physical property values of the entire unrelated layer and adopting the calculated macro physical property value as an equivalent physical property value of the entire unrelated layer without performing calculation of an equivalent physical property value according to the finite element analysis. Note that, since a method of calculating a modulus of longitudinal elasticity for an unrelated layer is the same as the method of calculating a modulus of longitudinal elasticity for a layer without directionality, the method of calculating a modulus of longitudinal elasticity for an unrelated layer will not be explained.

A specific equation for calculating a coefficient of thermal expansion $\alpha_h$ for an unrelated layer is represented as $$\alpha_h = \frac{(1-v_f)\alpha_r E_r V_r + (1-v_r)\alpha_f E_f V_f}{(1-v_f)E_r V_r + (1-v_r)E_f V_f} \qquad (7)$$

where $v_r$ included in equation (7) indicates a Poisson's ratio of a matrix constituting a laminate, $v_f$ indicates a Poisson's ratio of a wiring material constituting the laminate, $\alpha_r$ indicates a coefficient of thermal expansion of the matrix constituting the laminate, $\alpha_f$ indicates a coefficient of thermal expansion of the wiring material constituting the laminate, $E_r$ indicates a modulus of longitudinal elasticity of the matrix constituting the laminate, $E_f$ indicates a modulus of longitudinal elasticity of the wiring material constituting the laminate, $V_r$ indicates a volume fraction of the matrix constituting the laminate, and $V_f$ indicates a volume fraction of the wiring material constituting the laminate.

Here, the Poisson's ratios $v_r$ and $v_f$, the coefficients of thermal expansion $\alpha_r$ and $\alpha_f$, the moduli of longitudinal elasticity $E_r$ and $E_f$, and the volume fractions $V_r$ and $V_f$ are inputted from the input device 200 together with the Gerber data or the like and passed to the equivalent-physical-property-value-calculation processing unit 120 by the area division processing unit 110.

Then, the unrelated layer physical property value calculating unit 120d calculates a modulus of longitudinal elasticity and a coefficient of thermal expansion of an unrelated layer using equations (5), (6), and (7) and passes the calculated modulus of longitudinal elasticity and coefficient of thermal expansion to the warp-simulation-execution processing unit 130 as equivalent physical property values.

Figure 5:
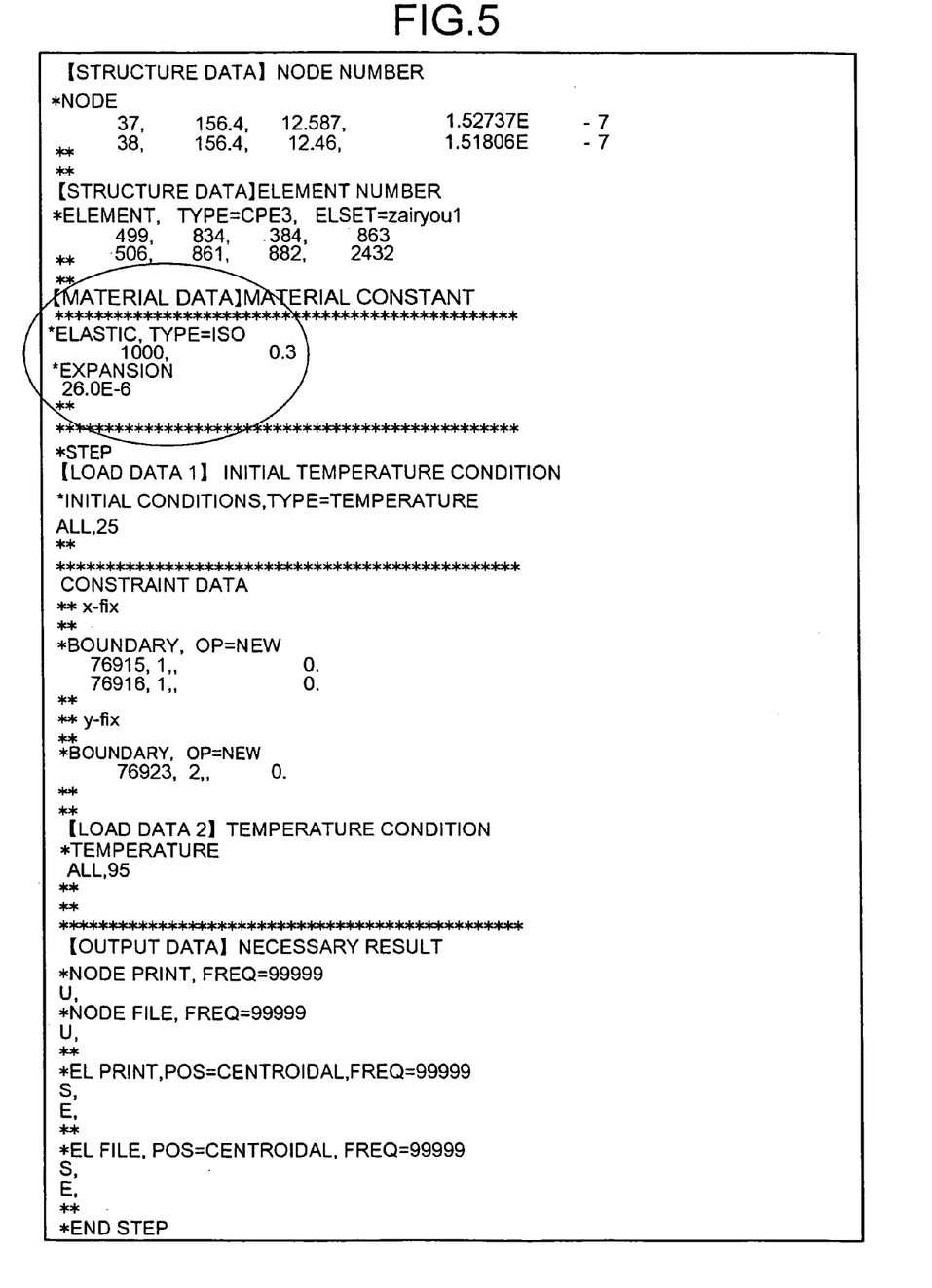
FIG. 5 is a diagram of an example of a data structure of a simulation file.

The warp-simulation-execution processing unit 130 is a processing unit that receives equivalent physical property values of respective areas in respective layers from the equivalent-physical-property-value-calculation processing unit 120 and predicts deformation of a board based on the received equivalent physical property values. When this warp-simulation-execution processing unit 130 receives the equivalent physical property values of the respective areas in the respective layers from the equivalent-physical-property-value-calculation processing unit 120, the warp-simulation-execution processing unit 130 converts the equivalent physical property values into a simulation file using a data conversion program. FIG. 5 is a diagram of an example of a data structure of the simulation file.

As shown in FIG. 5, the warp-simulation-execution processing unit 130 converts the equivalent physical property values passed from the equivalent-physical-property-value-calculation processing unit 120 into material data and uses the converted material data in a warp simulation.

In addition, the warp-simulation-execution processing unit 130 extracts information on an external shape, a thickness, and a layer structure of the board from the Gerber data and creates simulation shape data based on the extracted information. Then, the warp-simulation-execution processing unit 130 executes the warp simulation using the simulation file and the simulation shape data and outputs a result of the execution to the output device 300.

Figure 6:
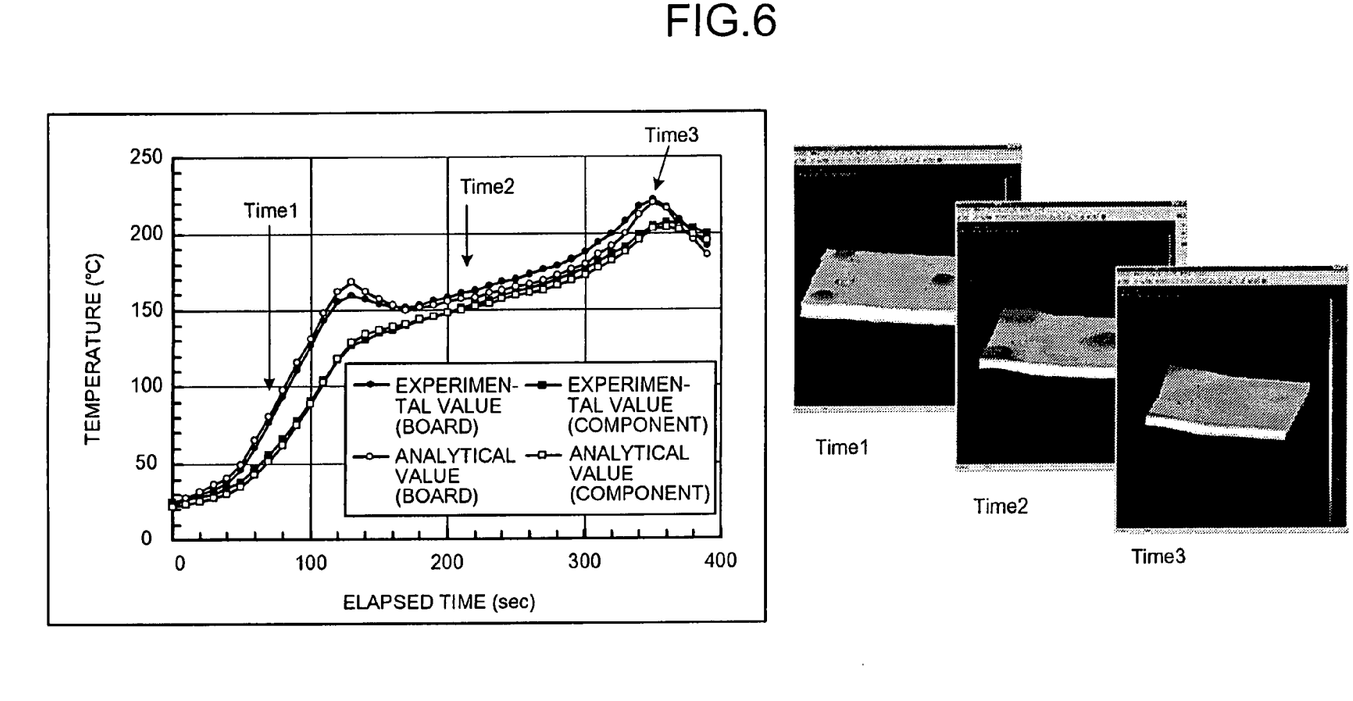
FIG. 6 is a diagram of an example of an execution result of a warp simulation outputted by the board deformation predicting apparatus according to the embodiment in FIG. 1A.

FIG. 6 is a diagram of the example of a result of execution of the warp simulation outputted by the board deformation predicting apparatus 100 according to the present embodiment.

In a graph shown in FIG. 6, a horizontal axis indicates an elapsed time and a vertical axis indicates a temperature. It is seen from the figure that experimental values of a board and components constituting the board according to prototype evaluation and analytic values of the board and the component constituting the board predicted by the board deformation predicting apparatus 100 substantially coincide with each other. Note that images of the board shown in FIG. 6 represent deformation states of the board at Time 1, Time 2, and Time 3.

Figure 7:
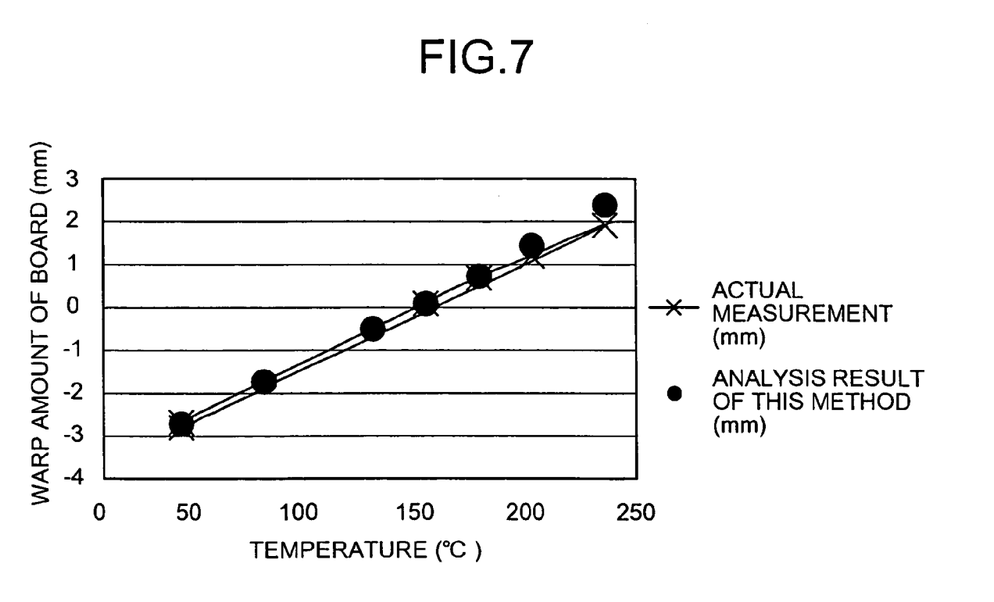
FIG. 7 is a diagram of an evaluation result of a warp simulation outputted by the board deformation predicting apparatus according to the embodiment in FIG. 1A.

FIG. 7 is a diagram of an evaluation result of the warp simulation outputted by the board deformation predicting apparatus 100 according to the present embodiment. In a graph shown in FIG. 7, a horizontal axis indicates a temperature and a vertical axis indicates a warp amount of a board. A solid line shown in the figure indicates actually measured values of board deformation according to prototype evaluation and black circles indicate predicted values predicted by the board deformation predicting apparatus 100. The actually measured values and the prediction values coincide with each other with high accuracy, and usefulness of the present invention can be confirmed.

Figure 8:
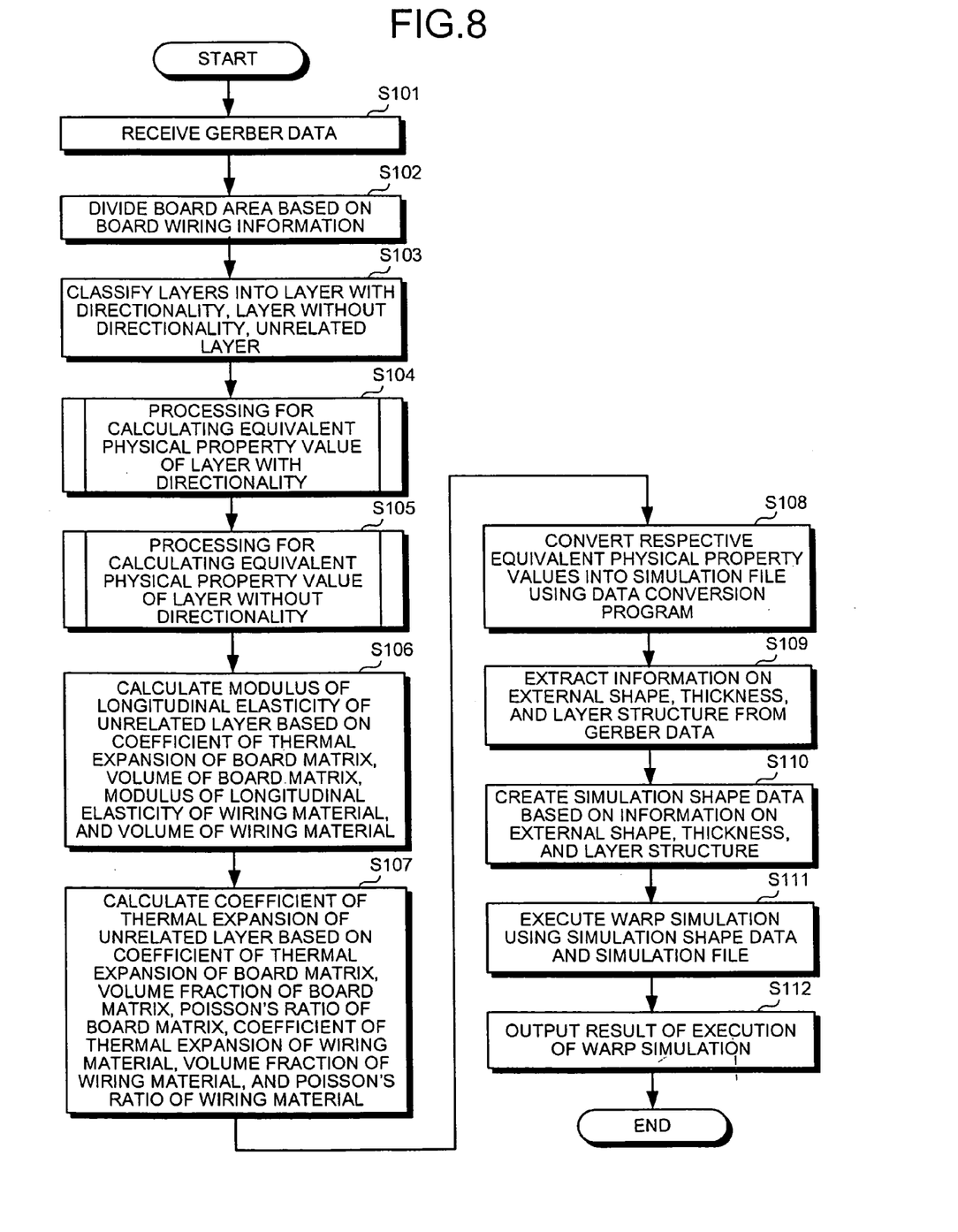
FIG. 8 is a flowchart of a processing procedure of the board deformation predicting apparatus.

FIG. 8 is a flowchart of a processing procedure of the board deformation predicting apparatus 100. As shown in the figure, in this board-deformation predicting apparatus 100, the area division processing unit 110 receives Gerber data (step S101) and divides a board area based on board wiring information (step S102).

The equivalent-physical-property-value-calculation processing unit 120 classifies layers into a layer with directionality, a layer without directionality, and an unrelated layer (step S103), executes processing for calculating an equivalent physical property value of a layer with directionality (step S104), executes processing for calculating an equivalent physical value of a layer without directionality (step S105), and calculates a modulus of longitudinal elasticity of the unrelated layer based on a modulus of longitudinal elasticity of a board matrix, a volume of the board matrix, a modulus of longitudinal elasticity of a wiring material, and a modulus of longitudinal elasticity of the wiring material (step S106).

Then, the equivalent-physical-property-value-calculation processing unit 120 calculates a coefficient of thermal expansion of the unrelated layer based on a coefficient of thermal expansion of the board matrix, a volume fraction of the board matrix, a Poisson's ratio of the board matrix, a coefficient of thermal expansion of the wiring material, a volume fraction of the wiring material, and a Poisson's ratio of the wiring material (step S107).

The warp-simulation-execution processing unit 130 converts the respective equivalent physical property values into a simulation file using a data conversion program (step S108), extracts information on an external shape, a thickness, and a layer structure from the Gerber data (step S109), and creates simulation shape data based on the extracted information on an external shape, a thickness, and a layer structure (step S110).

Then, the warp-simulation-execution processing unit 130 executes the warp simulation using the simulation shape data and the simulation file (step S111) and outputs a result of execution of the warp simulation (step S112).

In this way, in the board deformation predicting apparatus 100, the area division processing unit 110 divides the board with roughness corresponding to wiring densities base on wiring information on the board, and the equivalent-physical-property-value-calculation processing unit 120 calculates an equivalent physical property value for respective areas in respective layers and executes the warp simulation based on the calculated equivalent physical property value. Therefore, it is possible to predict warp of the board efficiently.

Figure 9:
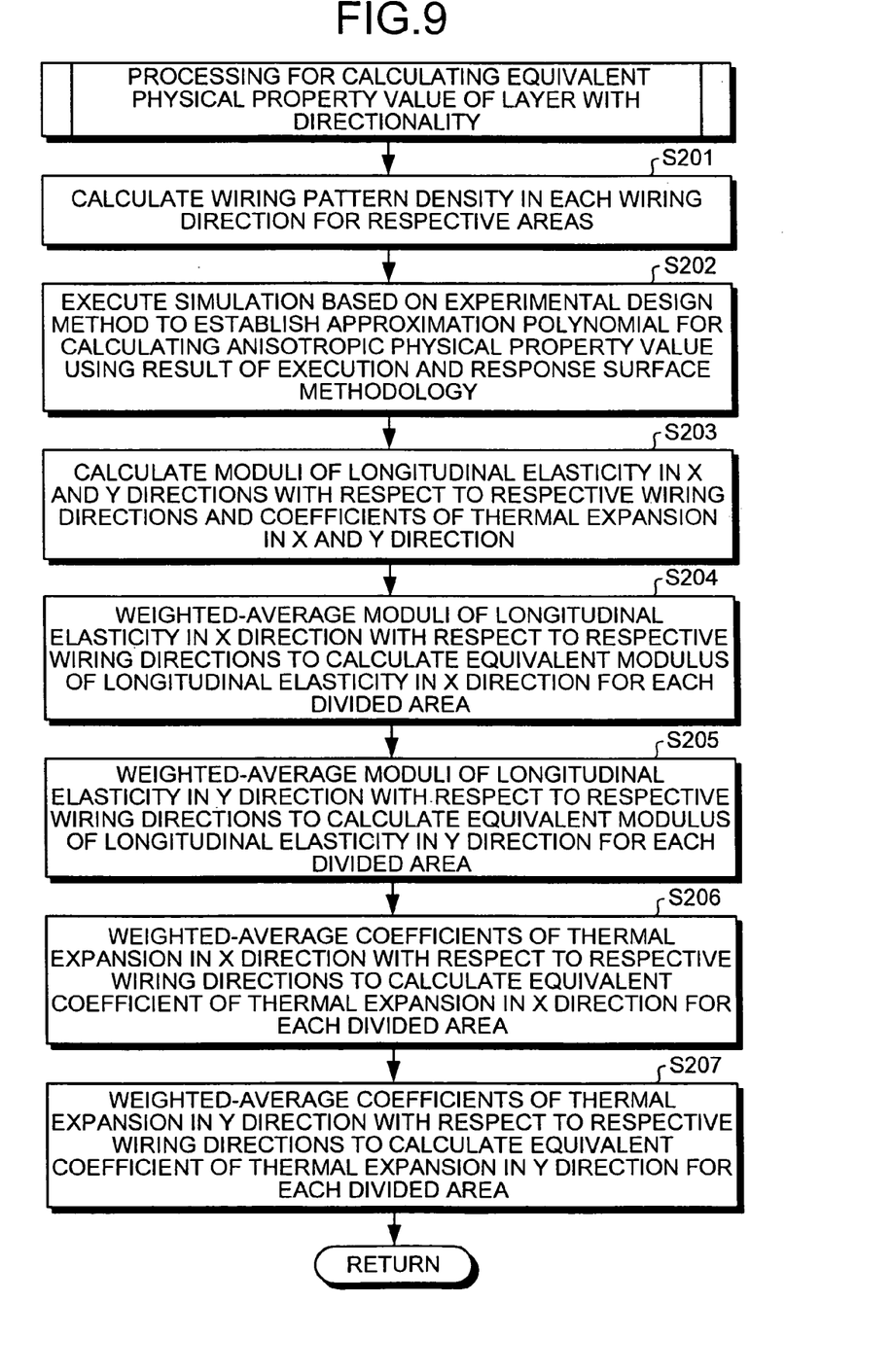
FIG. 9 is a flowchart of processing for calculating an equivalent physical property value of a layer with directionality indicated in step S104 in FIG. 8.

FIG. 9 is a flowchart of the processing for calculating an equivalent physical property value of a layer with directionality indicated in step S104 in FIG. 8.

As shown in FIG. 9, the equivalent-physical-property-value-calculation processing unit 120 calculates a wiring pattern density in each wiring direction for respective areas (step S201), executes a simulation based on the experimental design method to establish an approximation polynomial for calculating an anisotropic physical property value using a result of the execution and the response surface methodology (step S202), and calculates moduli of longitudinal elasticity in the X and Y directions with respect to the respective wiring directions and coefficients of thermal expansion in the X and Y directions (step S203).

Then, the equivalent-physical-property-value-calculation processing unit 120 weighted-averages the moduli of longitudinal elasticity in the X direction with respect to the respective wiring directions to calculate an equivalent modulus of longitudinal elasticity in the X direction for each divided area (step S204) and weighted-averages the moduli of longitudinal elasticity in the Y direction with respect to the respective wiring directions to calculate an equivalent modulus of longitudinal elasticity in the Y direction for each divided area (step S205).

Then, the equivalent-physical-property-value-calculation processing unit 120 weighted-averages the coefficients of thermal expansion in the X direction with respect to the respective wiring directions to calculate an equivalent coefficient of thermal expansion in the X direction for each divided area (step S206) and weighted-averages the coefficients of thermal expansion in the Y direction with respect to the respective wiring directions to calculate an equivalent coefficient of thermal expansion in the Y direction for each divided area (step S207).

In this way, in the board deformation predicting apparatus 100, the physical property value of layer with directionality calculating unit 120b calculates a wiring pattern density in each wiring direction for respective areas, calculates moduli of longitudinal elasticity and coefficients of thermal expansion in the X direction and the Y direction with respect to the respective wiring directions, and calculates equivalent physical property values of respective areas in a layer with directionality based on the calculated values. Therefore, it is possible to calculate equivalent physical property values with high reliability with respect to the warp simulation.

Figure 10:
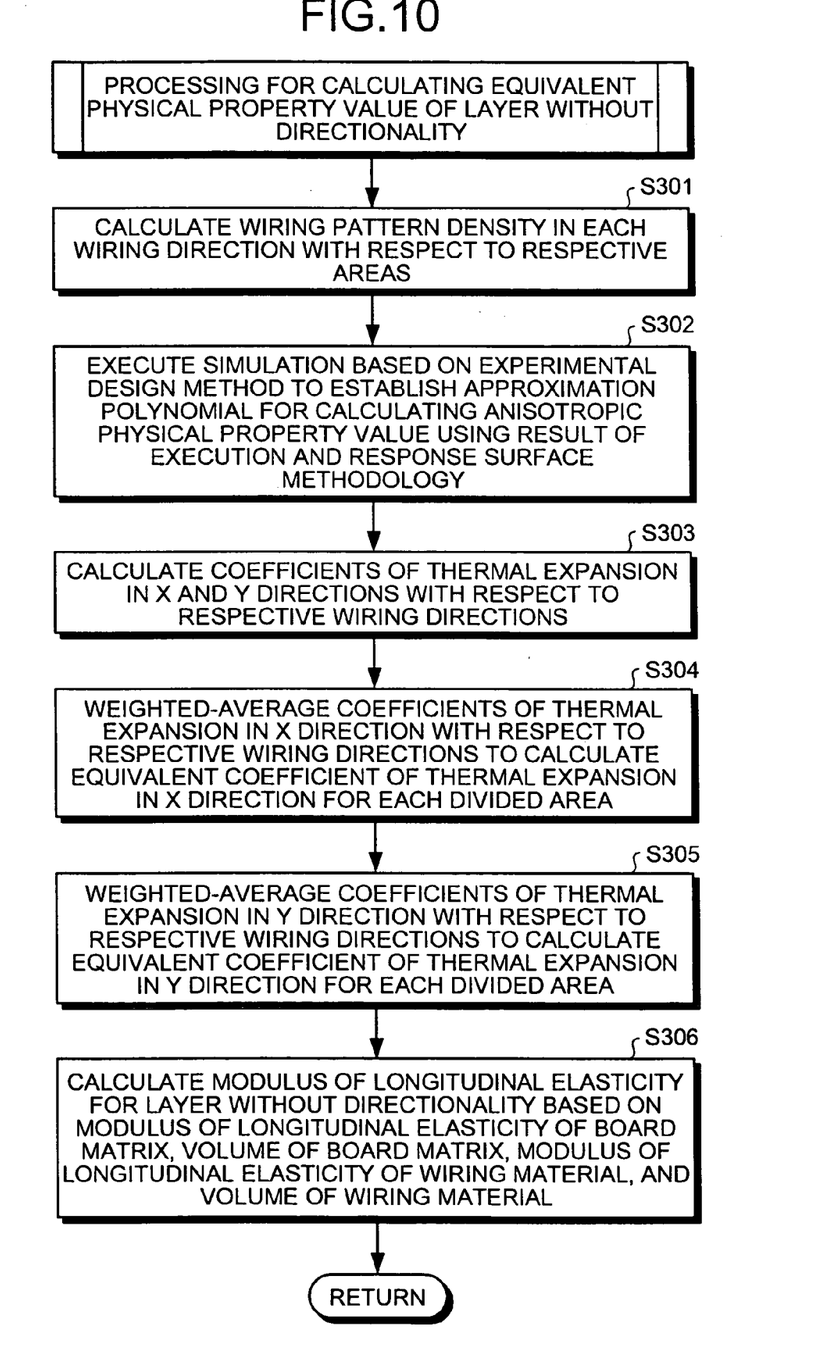
FIG. 10 is a flowchart of processing for calculating an equivalent physical property value of a layer Without directionality indicated in step S105 in FIG. 8.

FIG. 10 is a flowchart of the processing for calculating an equivalent physical property value of a layer without directionality indicated in step S105 in FIG. 8.

As shown in FIG. 10, the equivalent-physical-property-value-calculation processing unit 120 calculates a wiring pattern density in each wiring direction for respective areas (step S301), executes a simulation based on the experimental design method to establish an approximation polynomial for calculating an anisotropic physical property value using a result of the execution and the response surface methodology (step S302), and calculates coefficients of thermal expansion in the X and Y direction with respect to the respective wiring directions (step S303).

Then, the equivalent-physical-property-value-calculation processing unit 120 weighted-averages coefficients of thermal expansion in the X direction with respect to the respective wiring directions to calculate an equivalent coefficient of thermal expansion in the X direction for each divided area (step S304) and weighted-averages coefficients of thermal expansion in the Y direction with respect to the respective wiring directions to calculate an equivalent coefficient of thermal expansion in the Y direction for each divided area (step S305).

Then, the equivalent-physical-property-value-calculation processing unit 120 calculates a modulus of longitudinal elasticity for the layer without directionality based on the modulus of longitudinal elasticity of the board matrix, the volume of the board matrix, and the modulus of longitudinal elasticity of the wiring material (step S306).

In this way, in the board deformation predicting apparatus 100, the physical property value of layer without directionality calculating unit 120c calculates a modulus of longitudinal elasticity for an equivalent physical property value of a layer without directionality based on a volume ratio. Therefore, it is possible to calculate an equivalent physical property value promptly.

As described above, in the board deformation predicting apparatus 100 according to the present embodiment, the area division processing unit 110 divides a board into areas of sizes corresponding to wiring pattern densities based on Gerber data inputted from the input device 200, the equivalent physical property calculation processing unit 120 calculates an anisotropic physical property value in each wiring direction of the respective areas and calculates equivalent physical property values of the respective divided areas, and the warp-simulation-execution processing unit 130 predicts warp of the board based on the equivalent physical property values. Therefore, it is possible to carry out analysis for warp of the board in a short time and at low cost while maintaining the same accuracy as the analysis method according to the conventional method.

According to the present invention, the board deformation predicting apparatus divides a board into plural areas based on wiring information on the board, grasps wiring patterns of the areas macroscopically for each of the divided areas, calculates equivalent physical property values equivalent to a modulus of longitudinal elasticity and a coefficient of thermal expansion that are calculated by the finite element method or the like, and predicts deformation of the board based on the calculated equivalent physical property values. Thus, there is an effect that it is possible to predict warp of the board efficiently.

The board deformation predicting apparatus divides a board into plural areas based on wiring information on the board, calculates wiring densities with respect to plural wiring directions of the divided areas, calculates an anisotropic physical property value, which indicates a modulus of longitudinal elasticity and a coefficient of thermal expansion in a wiring direction, for each of the divided areas based on the wiring densities and matrix physical property values, and calculates equivalent physical property values based on the calculated anisotropic physical property value. Thus, there is an effect that it is possible to carry out analysis for warp of the board in a short time and at low cost while maintaining the same accuracy as the analysis method according to the conventional method.

The board deformation predicting apparatus divides an area finely for a part of a board with a high wiring density and divides an area roughly for a part of the board with a low wiring density. Thus, there is an effect that it is possible to calculate equivalent physical property values for the respective areas efficiently.

In the board deformation prediction method, a board is divided into plural areas based on wiring information on the board, wiring patterns of the areas are grasped macroscopically for each of the divided areas, equivalent physical property values equivalent to a modulus of longitudinal elasticity and a coefficient of thermal expansion, which are calculated by the finite element method or the like, are calculated, and deformation of the board is predicted based on the calculated equivalent physical property values. Thus, there is an effect that it is possible to predict warp of the board efficiently.

The board deformation prediction program divides a board into plural areas based on wiring information on the board, grasps wiring patterns of the areas macroscopically for each of the divided areas, calculates equivalent physical property values equivalent to a modulus of longitudinal elasticity and a coefficient of thermal expansion that are calculated by the finite element method or the like, and predicts deformation of the board based on the calculated equivalent physical property values. Thus, there is an effect that it is possible to predict warp of the board efficiently.

As described above, the board deformation predicting apparatus, the board deformation prediction method, and the board deformation prediction program according to the present invention is useful for a board deformation predicting apparatus that is required to predict warp of a printed-wiring-board and the like efficiently and at low cost.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus for predicting a deformation of a board, the apparatus comprising:
    an input unit that inputs computer aided design data and matrix physical property values to the apparatus;
    a board dividing unit that divides the board into a plurality of areas based on wiring information on the board;
    a deformation predicting unit that grasps a wiring pattern of an area macroscopically, calculates an equivalent physical property value equivalent to a modulus of longitudinal elasticity for each of the plurality of areas of the board and a coefficient of thermal expansion for each of the plurality of areas of the board by a finite element method, and predicts the deformation of the board based on the equivalent physical property value calculated for each of the areas of the board divided by the board dividing unit; and
    a results generating unit that generates results containing information regarding the predicted deformation of the board, wherein the results are used to take measures for preventing deformation from occurring in advance.

2. The apparatus according to claim 1, wherein the deformation predicting unit includes
    a wiring-density calculating unit that calculates a wiring density for a plurality of wiring directions on the areas of the divided board;
    an anisotropic-physical-property-value calculating unit that calculates an anisotropic physical property value indicating the modulus of longitudinal elasticity and the coefficient of thermal expansion in the wiring directions, for each of the areas of the divided board based on the wiring density and a matrix physical property value; and
    an equivalent-physical-property-value calculating unit that calculates the equivalent physical property value based on the anisotropic physical property value.

3. The apparatus according to claim 1, wherein, concerning a layer that does not have a directionality of wiring patterns, the deformation predicting unit calculates the equivalent physical property value based on a volume ratio of a material constituting the board.

4. The apparatus according to claim 1, wherein, concerning a layer that does not directly contribute to deformation of all of the plurality of areas of the board, the deformation predicting unit calculates a macro physical property value obtained by averaging physical property values of an entire layer and adopts the macro physical property value calculated as the equivalent physical property value for the layer that does not directly contribute to deformation of all of the plurality of areas of the board.

5. The apparatus according to claim 1, wherein the board dividing unit finely divides a portion with a high wiring density, and roughly divides a portion with a low wiring density, based on the wiring information on the board.

6. A method of predicting a deformation of a board, the method comprising:

inputting computer aided design data and matrix physical property values to an apparatus;

dividing the board into a plurality of areas based on wiring information on the board;

predicting the deformation of the board based on an equivalent physical property value obtained by grasping a wiring pattern of an area macroscopically and calculating the equivalent physical property value equivalent to a modulus of longitudinal elasticity for each of the plurality of areas of the board and a coefficient of thermal expansion for each of the plurality of areas of the board based on a finite element method for each of the areas of the divided board; and generating results containing information regarding the predicted deformation of the board, wherein the results are used to take measures for preventing deformation from occurring in advance.

7. The method according to claim 6, wherein the predicting includes calculating a wiring density for a plurality of wiring directions on the areas of the divided board;

calculating an anisotropic physical property value indicating the modulus of longitudinal elasticity and the coefficient of thermal expansion in the wiring directions, for each of the areas of the divided board based on the wiring density and a matrix physical property value; and calculating the equivalent physical property value based on the anisotropic physical property value.

8. The method according to claim 6, wherein, the dividing includes, based on the wiring information on the board, dividing finely a portion with a high wiring density; and dividing roughly a portion with a low wiring density.

9. A computer-readable recording medium that stores a computer program for predicting a deformation of a board, wherein the computer program makes a computer execute:

the step of dividing the board into a plurality of areas based on wiring information on the board;

the step of predicting the deformation of the board based on an equivalent physical property value obtained by grasping a wiring pattern of an area macroscopically and calculating the equivalent physical property value equivalent to a modulus of longitudinal elasticity for each of the plurality of areas of the board and a coefficient of thermal expansion for each of the plurality of areas of the board based on a finite element method for each of the areas of the divided board; and the step of generating results containing information regarding the predicted deformation of the board, wherein the results are used to take measures for preventing deformation from occurring in advance.

10. The computer-readable recording medium according to claim 9, wherein the predicting includes calculating a wiring density for a plurality of wiring directions on the areas of the divided board;

calculating an anisotropic physical property value indicating the modulus of longitudinal elasticity and the coefficient of thermal expansion in the wiring directions, for each of the areas of the divided board based on the wiring density and a matrix physical property value; and calculating the equivalent physical property value based on the anisotropic physical property value.

11. The computer-readable recording medium according to claim 9, wherein, the dividing includes, based on the wiring information on the board, dividing finely a portion with a high wiring density; and dividing roughly a portion with a low wiring density.

* * * * *